J. J. & T. Clark,
Tenoning Blind Slats,
No. 82,801. Patented Oct. 6, 1868.
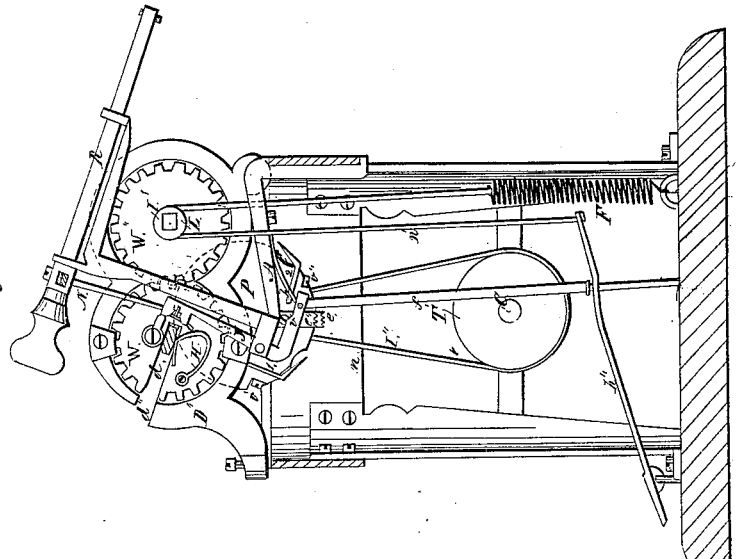
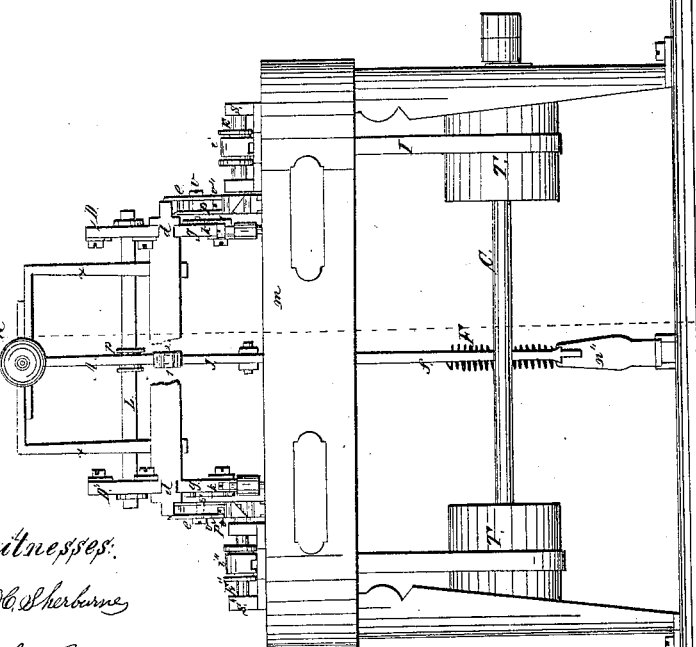
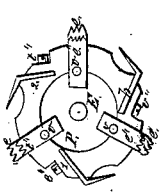
Witnesses:
Inventors:
John D. Clark
Thomas Clark

United States Patent Office.

JOHN J. CLARK AND THOMAS CLARK, OF ELGIN, ILLINOIS.

*Letters Patent No. 82,801, dated October 6, 1868.*

IMPROVEMENT IN BLIND-SLAT-TENONING MACHINE.

*The Schedule referred to in these Letters Patent and making part of the same.*

TO ALL WHOM IT MAY CONCERN:

Be it known that we, JOHN J. CLARK and THOMAS CLARK, of Elgin, in the county of Kane, State of Illinois, have invented certain new and useful Improvements in Machinery for Tenoning Blind-Slats; and we do hereby declare the following to be a full and exact description of the construction and operation of the same, reference being had to the annexed drawings, and to the letters of reference marked thereon, making a part of this specification, in which—

Figure 1 is a side elevation of the machine.

Figure 2 is a vertical transverse section of the same on line $e\ e$.

Figure 3 is a view of the cylinder employed in holding the knives or cutting-device, (detached.)

Similar letters of reference, where they occur in the separate figures, denote like parts in each of the drawings.

Our invention relates to an improvement in that class of machines wherein the slat is made to rotate by means of a system of geared wheels, which bring the same in contact with a series of rotating cutters, whereby the slat is cut to its proper length, and the tenons formed thereon; and the nature of our improvement consists, first, in a device for cutting and forming the tenons, and second, in a device for piercing the slat preparatory to driving the staple, as will be hereinafter more fully explained.

To enable others skilled in the art to more fully understand and construct our invention, we will proceed to describe the same with reference to the drawings.

$m$ represents the frame of the machine, and $c$ the line or driving-shaft. Upon said shaft are wheels, T and T″, that receive belts, $l$ and $l''$. Said belts pass upward and around pulleys, $i$ and $i''$, on horizontal shafts, E and E″, which are held in proper position by means of bearings, S and S″, that are bolted to the upper edge of the main frame, and so arranged as to be capable of being moved in the direction of the length to any graduated distance one from the other. On the inner end of said shafts E and E″ are attached cylinders, P and P″, that are provided with three series of saws, $e$ and $e''$, grooved or dove-tailed into the sides of said cylinders, and are held therein by means of bolts $v$ passing through the same, as shown in the drawings. Said saws pass from near the centre of the cylinder outward to a given distance, the length of saws $e$ being greater than that of saws $e''$, whereby, as said cylinder is rotated, the saws form two separate circles of greater and less dimensions. Attached to the rim of said cylinder, between said saws, are knives 1, 2, and 3, which are also grooved into edge or rim of the cylinder, and are held therein by means of bolts $v''$ passing through slots in shank of said knives, whereby the same can be adjusted to form any suitable circle to agree with the circle formed by the rotation of saws.

The objects of this style of mechanism are several: first, the saws and knives, when dull, can be more readily sharpened, and second, the knives do not clog with shavings between the saws, as is the case with machines wherein the tenon is formed by means of saws equal in diameter to that of the saws cutting the shoulder of the slat. Thus a smoother tenon can be formed, with less power employed, than by any heretofore known arrangements.

Between said cylinders, and bolted to the bearings holding the same, are racks, D and D″, which are also capable of being adjusted to any given distance one from the other, together with said bearings. Recessed within said racks D and D″ are gear-wheels, W and W″. Wheels W have their sides nearest said cylinder turned or cut away to form the bearing upon which it revolves, and is held within said rack by means of straps of iron bolted to the upper and lower edge of the same, which jut over the rim of the wheel. Said wheels W have slots $d$ cut therein, extending from the centre outward, and of sufficient size transversely to receive the slat; which, when placed therein, is in a horizontal line with the upper edge of the cutters. The slat is held within said slot by means of a spring, H, bolted to the inner sides of said wheel W. The slot in said wheel is in proper shape to agree with a corresponding slot, $d''$, cut in the rim of said racks D and D″, through which the slat passes. Attached to the outside of frames D and D″, is a ratchet-lever, X, which is pivoted at its centre to said rack; the outer end of said ratchet oscillating between stop-pins 8 and 9, protruding outward from said rack, the inner end of said ratchet coming in contact with or against a third stop-pin, 7, protruding outward from the rim of wheels W, thus admitting of said ratchet moving to a proper angle to allow said wheels to pass their centre at each revolution, thus bringing slot $d$ of wheels W to agree with the corresponding slot $d''$ in the rim of rack D and D'', as the motion of the wheels is reciprocated. Upon shaft L of wheels W'' is a pulley, $r$, which receives a strap, $n$, the same passing once around said pulley, and its ends passing downward through the centre of the main frame, one of which is connected to treadle $n''$, and the other connected to a coiled spring, F, which is fastened to the floor beneath said frame. Attached to the centre of the main frame, between racks D and D'', is a second frame or rack, A, which passes upward, and is provided at the upper end with an adjustable slide, R, to which are connected adjustable arms, $x$ and $x$, extending backward and downward below the centre of wheel W, as is shown in the drawings. At the inner and lower end of said frame A, at the curved part thereof, is hinged an oscillating lever, J. The lower end of the same is bent around in the form of the letter L. The end of the bent portion thereof is hinged to a vertical shaft, $f$, which passes downward through treadle $n''$. Fastened to the lower side of frame or rack A, is a curved spring, $h$, the curved end thereof passing downward, and resting upon the upper part of the bent portion of lever J. The upper portion of said lever J passes upward, and is provided at its end with a groove cut therein transversely, which receives piercing-awls $t$ and $t''$. Said groove and awls are so arranged, as to height, as to strike the slat, when placed within slot $d$ of wheel W, when lever J is thrown forward.

The objects of this arrangement are several: first, the slat is pierced to receive the staple at the same time the tenon is formed; thus, in large manufacturing-establishments, the great amount of labor in rehandling the slat for the purpose of piercing the same is saved; and second, the tenon being cut on each slat at an equal distance from the edge of the slat nearest to the stop-slide $c$, and by piercing the same when in the machine, a face-side to the slat is formed, whereby a free and easy movement is given to the adjusting-rod of the blind when put together.

The operation of our machine is as follows: The slat to be tenoned is placed within slot $d$ of wheel W. The outer end of treadle $n''$ is forced downward by the operator, which raises the inner end of the same against the shoulder on vertical shaft $f$, which communicates with lever J, raising the same, thus throwing the upper end forward, which brings the piercing-awls in contact with the edge of the slat, whereby the same is pierced preparatory to driving the staple. The slat being within said slot $d$ and $d''$ of wheel W, which brings the end of the slat in contact with saws $e\ e''$, and knives 1, 2, and 3, of cylinder P, and as wheels T T'' of shaft C are rotated, which communicate with pulleys $i\ i''$ of shafts E E'', by means of belts $l\ l''$, cylinders P are subjected to a high rotary motion. Treadle $n$ is then forced downward by the operator, which communicates with pulley $r$ on shaft L of wheels W'', by means of strap $n''$. Said wheels W'', gearing with wheels W, cause the same to revolve once around; thus saws $e$ cut the slat to a proper length, saws $e''$ cut the shoulder, and knives 1, 2, and 3 form or round the tenon. Treadle $n$ is then allowed to rise by means of spring F, which communicates with the same by means of strap $n$; thus the wheels are rotated backward until the corresponding slats $d\ d''$ agree. Slide R is then drawn forward, which comes in contact with the slat, thus forcing the same out of said slots by means of arms $x\ x$.

Having thus described the nature and object of our invention, we claim as new, and desire to secure by Letters Patent—

Cylinder P, provided with saws $e$ and $e''$, knives 1, 2, and 3, in combination with wheels W and W'', constructed and arranged to operate together substantially as and for the purpose set forth.

JOHN J. CLARK.
THOMAS CLARK.

Witnesses:
    N. H. SHERBURNE,
    JAMES T. WHIPPLE.